Feb. 23, 1926.  A. GRUNFELD  1,573,825
APPARATUS FOR VIEWING CINEMATOGRAPHIC FILM BANDS
Filed April 8, 1925   3 Sheets-Sheet 3
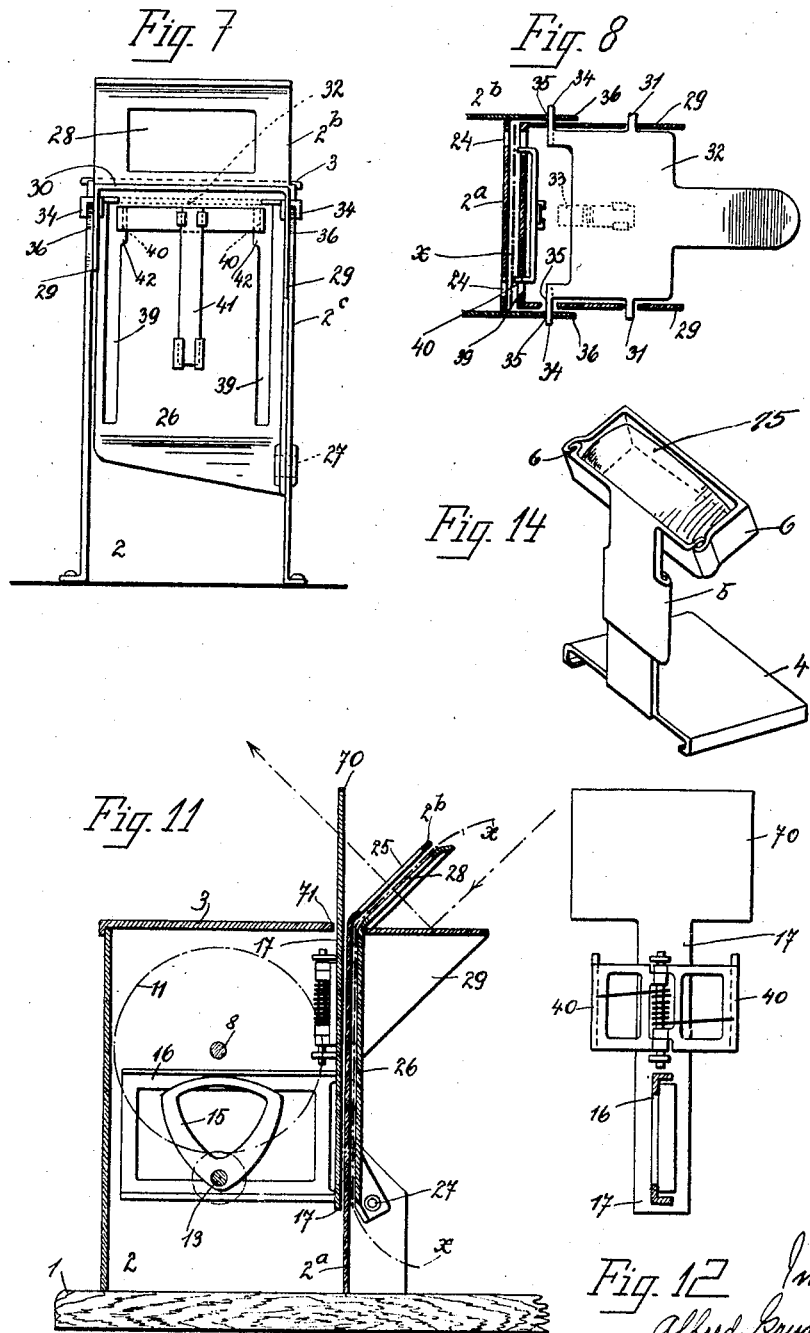

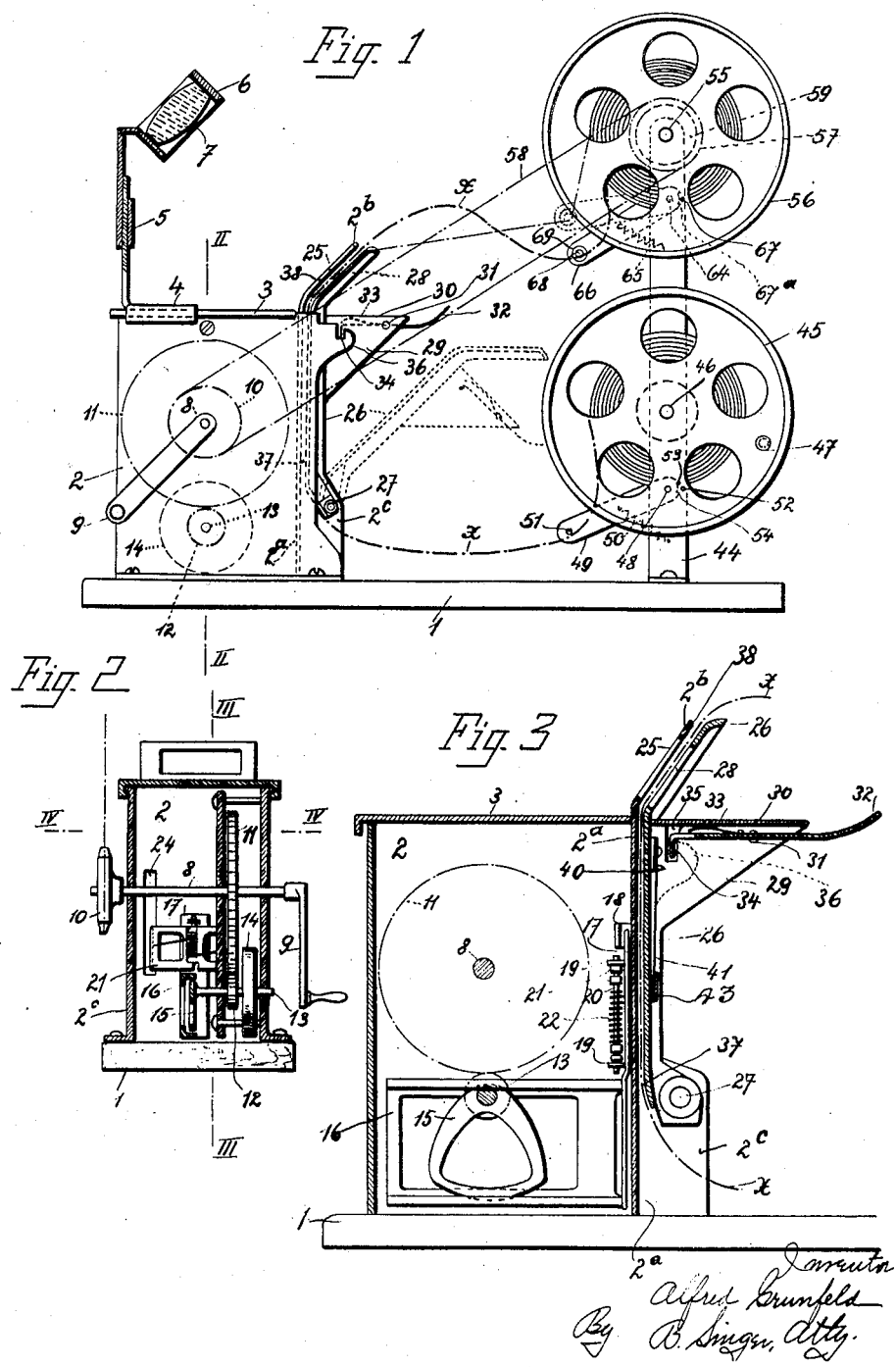

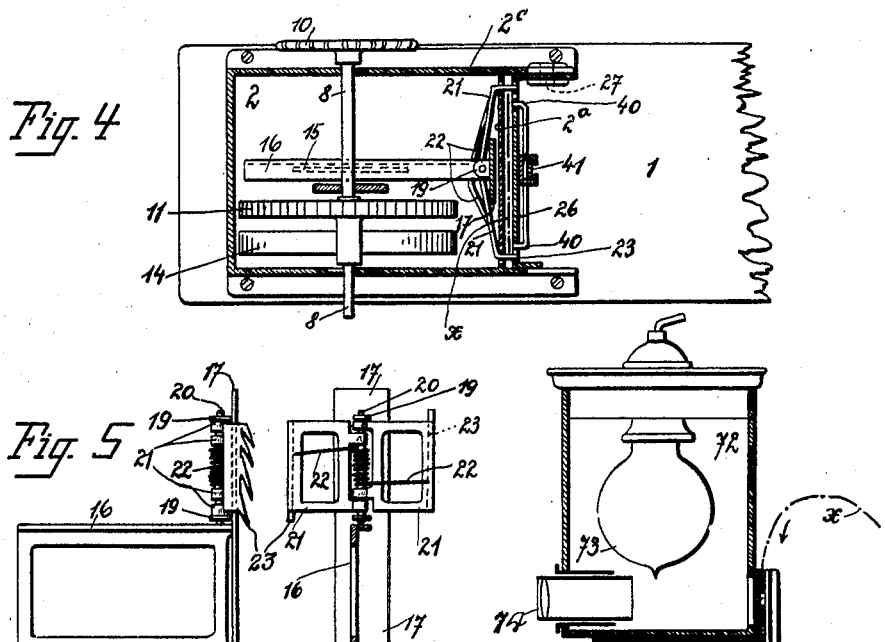
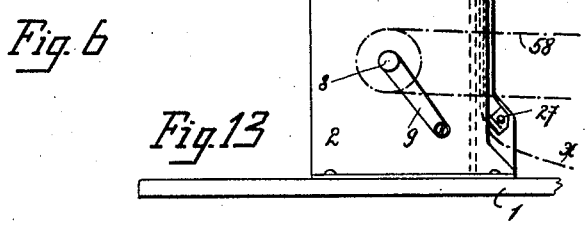
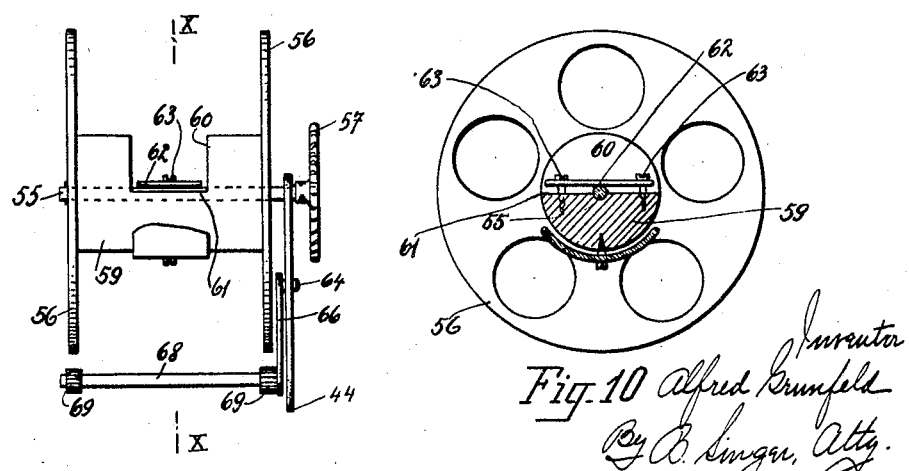

Patented Feb. 23, 1926.

1,573,825

UNITED STATES PATENT OFFICE.

ALFRED GRÜNFELD, OF VIENNA, AUSTRIA.

APPARATUS FOR VIEWING CINEMATOGRAPHIC FILM BANDS.

Application filed April 8, 1925. Serial No. 21,619.

*To all whom it may concern:*

Be it known that I, ALFRED GRÜNFELD, a citizen of the Republic of Austria, residing at Vienna, Austria, have invented certain new and useful Improvements in an Apparatus for Viewing Cinematographic Film Bands, of which the following is a specification.

This invention relates to an apparatus for viewing cinematographic film-bands, which is composed of parts of simple construction and mainly manufactured by means of stamping or pressing and which can be attended to without any professional knowledge.

The apparatus according to the present invention essentially consists in that the guide for leading or guiding the film-band is formed by two angularly bent branches of a plate, by which the part of the film-band passing between the same is bent and owing to its elasticity is pressed or forced against the feeding arrangement and window.

One mode of carrying out the present invention is shown by way of example on the accompanying sheets of drawings in which—

Fig. 1 shows in side view, partly in section, the apparatus according to the present invention.

Fig. 2 is sectional front view of the apparatus, the section being taken on line II—II of Fig. 1.

Fig. 3 is a sectional view according to line III—III of Fig. 2.

Fig. 4 is a sectional view according to line IV—IV of Fig. 2.

Figs. 5 and 6 show the film feeding arrangement in side view and front view respectively.

Fig. 7 illustrates a part of the casing in rear view and

Fig. 8 the shutter for this part of the casing.

Fig. 9 is a front view of the winding-up drum, and

Fig. 10 a sectional view of the drum, the section being taken on line X—X of Fig. 9.

Figs. 11 and 12 show a modified construction of the arrangements illustrated in Figs. 3 and 6 respectively.

Fig. 13 shows partly in section an apparatus for viewing not transparent film-bands, and Fig. 14 a binocular viewing or observing device.

The apparatus comprises a base-plate 1, to which is secured a casing 2, a longitudinally adjustable slide 4 being mounted on the lid 3 of the said casing. A viewing or observing device, consisting of a frame 6 and a lens 7, is adjustably mounted on the vertically disposed arm of the slide 4 by means of a sleeve 5. A driving gear is located within the casing 2, the said gear comprising a shaft 8, mounted in the side walls of the said casing. The ends of the shaft 8 extend out of the casing and an operating handle 9 is secured to one of the said ends, while a driving wheel 10, preferably a chain-wheel, is fixed to the other end of the shaft 8. A toothed wheel 11 is fixed to the latter within the casing 2 and meshes with a pinion 12, secured to an auxiliary shaft 13. A fly-wheel 14 and a heart-shaped eccentric 15 are mounted on the shaft 13, the said eccentric 15 acting on a frame 16, which is secured to a slide 17. The letter is disposed vertically adjustable in guides 18, secured to the rear wall 2ª of the casing 2, and is provided with bearings 19 for a pin 20. Two flaps or wings 21 are hinged to the said pin and are pressed against the rear wall 2ª by means of a spring 22. The outer edges of the wings, which are disposed parallel with respect to the pin 20, are provided with serrations or teeth 23, which are distanced apart from each other for a distance corresponding to the distance between the perforations of the film-band $x$ and which pass through openings 24 provided in the wall 2ª of the casing.

The operative or upper face as well as the back face of each tooth 23 is inclined with respect to the direction of movement of the film-band. The upper end of the casing wall 2ª terminates in an extension 2ᵇ, which is provided with a window 25 of the size of an image.

A guide flap 26, hinged to a link 27 and adapted to swing out to one side, is attached to the side wall 2ᶜ of the casing 2. Near its top end the said flap 26 is furnished with a window 28, corresponding to the window 25, and with a vertically disposed extension 29, the upper face 30 of the latter being shaped so as to reflect the light. A locking lever 32, adapted to be rotated about bearing pins 31, is arranged underneath the extension 29 and provided with laterally disposed hooked members 34, the latter being adapted to pass through recesses of the said extension and the said lever is under the action of a spring 33. The hooked members 34 engage lugs 36 on the side walls of the casing and maintain the flap 26 in an upright position parallel to the wall 2ª. The latter and the flap 26 form an angularly bent clearance 37, 38 for the passage of the film-band $x$, the perforations of the latter being adapted to be engaged by the teeth 23 of the flaps, slots 39 being provided in the flap 26 for the pointed ends of the said teeth. The film-band $x$ is pressed against the wall 2ª by projections 40, which are mounted on a spring 41 and pass through the enlarged part 42 of the slots 39 provided in the flap 26. The spring 41 is secured to the latter at 43.

The winding arrangement for the film-band is mounted on a support 44. The winding-off drum 45 is disposed freely rotatable on a shaft 46 and is provided with a handle 47 to enable the winding up of the film-band. The drum 45 cooperates with a pre-winder 49 in the shape of a lever, oscillating about a pin 48 and under the influence of a spring 50, the film-loop being formed by a pin 51 mounted on the lever 49. The oscillations of the lever 49 are limited by a fixed stop 52 and extensions 53, 54.

The shaft 55 of the winding-up drum 56 is positively driven by means of a chain wheel 57 and a chain 58. The boss 59 of the drum 56 is mounted freely rotatable on the shaft 55 and is taken along by it with the aid of a friction coupling. The boss 59 of the drum is provided with a recess 60 in order to have free access to the shaft 55. A spring plate 62 is secured to the face 61 of the boss within the recess 60, the said spring plate cooperating with the shaft 55 and its pressure against the latter may be adjusted by means of screws 63. A tensioning device cooperates with the winding up drum 56, the said device comprising a lever 66, which is adapted to swing about a pin 64 secured to the standard 44 and is under the influence of a spring 65. The lowest position of the lever 66 is limited by a projection 67ª adapted to cooperate with a fixed stop 67. Further the said device comprises a pin 68, past which the film-band glides and which is provided with braking rollers 69, adapted to be pressed against the rims of the drum 56 and thereby stopping the rotation of the latter in spite of the rotating shaft 55, in case the device 66 is lifted on, if the film-band is subjected to a tension which is too great (Fig. 1).

In the construction shown in Figs. 11 and 12, the slide 17 is provided with a plate 70, which can be brought into the range of the light-beams between the image-window 25 and the viewing arrangement by passing through a slot 71, provided in the lid 3 of the casing. In this manner the film-band 70 is made invisible during its movement.

The viewing apparatus above described is suited for examining transparent as well as not transparent film-bands, because the film-band is illuminated from all sides. In the construction shown in Fig. 13, a lamp casing 72 is arranged on the casing of the apparatus 2 and a lamp 73 illuminates the film-band $x$. A projection lens 74, adjustably mounted in the lamp casing, serves for projecting the images of the not transparent film-band. In this construction the winding-up drum is disposed underneath the winding-off drum.

If desired also a diascopic observation glass 75 can be employed, so that the images will be seen enlarged and can be observed with both eyes or from a greater distance also by a number of persons.

In order to fix the film-band $x$ in the apparatus, the flap 26 is placed into the position shown in dotted lines in Fig. 1, so that the film-band can be inserted sideways into the film-guide clearance 37, 38, this having the advantage that also endless film-bands may be employed. The film-band has to be adjusted in such a manner, that an image of the same is correctly positioned with respect to the window 25. The projections 40 press the film-band against the window 25 and wall 2ª and prevent a disengagement from the teeth 23. On turning the handle 9, the eccentric 15 is rotated and thereby effects a rapid up and down motion of the slide 17. During the downward motion, the teeth 23 feed the film-band for the height of an image, while during the upward motion the teeth slide over the perforations and again engage the perforations of the film-band when the motion is reversed. The illuminated images appearing in the window 25 in quick succession appear as a moving picture when observing through the viewing arrangement.

A characteristic feature of the present invention consists in that practically all parts are of sheet-metal and are formed by stamping or pressing.

I claim—

1. An apparatus for viewing cinematographic film-bands, comprising in combination a casing, a film carrying and feeding means mounted in said casing, a film-guide mounted on said casing, the said guide being formed by two branches of a plate bent at an angle and forming the rear wall of the said casing, and a flap hinged to one of the said walls of the casing, the film-band being adapted to pass through the clear space between the said rear wall and flap.

2. An apparatus for viewing cinematographic film-bands, comprising in combination a casing, a film-guide mounted on said casing and formed by two branches of a plate bent at an angle and forming the rear wall of the said casing, a flap hinged to one of the side walls of the casing, the film-band being adapted to pass through the clear space between the said rear wall and flap, a film carrying and feeding means mounted in said casing within the range of one of the said branches, and an image-window and extensions for securing the correct position of the film-band located within the range of the other branch of the said plate.

3. An apparatus for viewing cinematographic film-bands, comprising in combination a casing, a film-guide mounted on said casing and formed by two branches of a plate bent at an angle and forming the rear wall of the said casing, a flap hinged to one of the side walls of the casing, the film-band being adapted to pass through between the said rear wall and flap, a film carrying and feeding means mounted in said casing mounted within the range of one of the said branches, the said film feeding means comprising a slide adapted to slide along the film-guide and yieldingly disposed grippers with teeth adapted to engage the perforations of the film-band during the feeding stroke and to yieldingly slide over these perforations during the ineffective stroke, and an image-window and extensions for securing the correct position of the film-band located within the range of the other branch of the said plate.

4. An apparatus for viewing cinematographic film-bands, comprising in combination a casing, a film-guide mounted on said casing and formed by two branches of a plate bent at an angle and forming the rear wall of the said casing, a flap hinged to one of the side walls of the casing, the film-band being adapted to pass through between the said rear wall and flap, a film carrying and feeding means mounted in said casing mounted within the range of one of the said branches, the said film feeding means comprising a slide adapted to slide along the film-guide and wings hinged to the said slide and provided with gripper-teeth adapted to engage the perforations of the film-band during the feeding stroke and to yieldingly slide over these perforations during the ineffective stroke, and an image-window and extensions for securing the correct position of the film-band located within the range of the other branch of the said plate.

5. An apparatus for viewing cinematographic film-bands, comprising in combination a casing, a film-guide mounted on said casing and formed by two branches of a plate bent at an angle and forming the rear wall of the said casing, a flap hinged to one of the said walls of the casing, the film-band being adapted to pass through between the said rear wall and flap, a film carrying and feeding means mounted in said casing mounted within the range of one of the said branches, the said film feeding means comprising a slide adapted to slide along the film-guide and yieldingly disposed grippers with teeth adapted to engage the perforations of the film-band during the feeding stroke and to yieldingly slide over these perforations during the ineffective stroke, the upper face as well as the back face of each tooth being inclined with respect to the direction of movement of the film-band, and an image-window and extensions for securing the correct position of the film-band located within the range of the other branch of the said plate.

6. An apparatus for viewing cinematographic film-bands, comprising in combination a casing, a film-guide mounted on said casing and formed by two branches of a plate bent at an angle and forming the rear wall of the said casing, a flap hinged to one of the side walls of the casing, the film-band being adapted to pass through between the said rear wall and flap, a film carrying and feeding means mounted in said casing mounted within the range of one of the said branches, the said film feeding means comprising a slide adapted to slide along the film-guide and wings hinged to the said slide and provided with gripper-teeth adapted to engage the perforations of the film-band during the feeding stroke and to yieldingly slide over these perforations during the ineffective stroke, the upper face as well as the back face of each tooth being inclined with respect to the direction of movement of the film-band, and an image-window and extensions for securing the correct position of the film-band located within the range of the other branch of the said plate.

7. An apparatus for viewing cinematographic film-bands, comprising in combination a casing, a film-guide mounted on said casing and formed by two branches of a plate bent at an angle and forming the rear wall of the said casing, a flap hinged to one of the side walls of the casing, the film-band being adapted to pass through between the said rear wall and flap, a film carrying and feeding means mounted in said casing mounted within the range of one of the said branches, the said film feeding means comprising a slide adapted to slide along the film-guide and yieldingly disposed grippers with teeth adapted to engage the perforations of the film-band during the feeding stroke and to yieldingly slide over these perforations during the ineffective stroke, a frame secured to the said slide at a right angle to the latter, a heart-shaped eccentric member mounted in the said casing and cooperating with the said frame to impart to the latter an up and down movement, and an image-window and extensions for securing the correct position of the film-band located within the range of the other branch of the said plate.

8. An apparatus for viewing cinematographic film-bands, comprising in combination a casing, a film carrying and feeding means mounted in said casing, a film-guide mounted on said casing, the said guide being formed by two branches of a plate bent at an angle and forming the rear wall of the said casing, and an observation device mounted on the said casing, the said observation device comprising two members which are adjustable at a right angle to each other, one of these members being slidably disposed on the other member while the latter is slidable along the lid of the said casing.

9. An apparatus for viewing cinematographic film-bands, comprising in combination a casing, a film-guide mounted on said casing and formed by two branches of a plate bent at an angle and forming the rear wall of the said casing, a flap hinged to one of the side walls of the casing, the film-band being adapted to pass through the clear space between the said rear wall and flap, a film carrying and feeding means mounted in said casing within the range of one of the said branches, and an observation device mounted on the said casing, the said observation device comprising two members which are adjustable at a right angle to each other, one of these members being slidably disposed on the other member, while the latter is slidable along the lid of the said casing.

10. An apparatus for viewing cinematographic film-bands, comprising in combination a casing, a film carrying and feeding means mounted in said casing, a film-guide mounted on said casing, the said guide being formed by two branches of a plate bent at an angle and forming the rear wall of the said casing, and a light-reflecting surface on the said flap.

11. An apparatus for viewing cinematographic film-bands, comprising in combination a casing, a film-guide mounted on said casing and formed by two branches of a plate bent at an angle and forming the rear wall of the said casing, a flap hinged to one of the side walls of the casing, the film-band being adapted to pass through the clear space between the said rear wall and flap, a film carrying and feeding means mounted in said casing within the range of one of the said branches, and a light-reflecting surface on the said flap.

12. An apparatus for viewing cinematographic film-bands, comprising in combination a casing, a film carrying and feeding means mounted in said casing, a film-guide mounted on said casing, the said guide being formed by two branches of a plate bent at an angle and forming the rear wall of the said casing, and closing means which can be tilted laterally and is adapted to keep shut the said flap.

13. An apparatus for viewing cinematographic film-bands, comprising in combination a casing, a film-guide mounted on said casing and formed by two branches of a plate bent at an angle and forming the rear wall of the said casing, a flap hinged to one of the side walls of the casing, the film-band being adapted to pass through the clear space between the said rear wall and flap, a film carrying and feeding means mounted in said casing within the range of one of the said branches, and closing means which can be tilted laterally and is adapted to keep shut the said flap.

14. An apparatus for viewing cinematographic film-bands, comprising in combination a casing, a film carrying and feeding means mounted in said casing, a film-guide mounted on said casing, the said guide being formed by two branches of a plate bent at an angle and forming the rear wall of the said casing, closing means which can be tilted laterally and is adapted to keep shut the said flap, the said means comprising a lever hinged to the flap and hook-shaped extensions, lateral slots in the flap through which the said extensions pass, and lugs in the side walls of the casing with which the said extensions are adapted to co-act.

15. An apparatus for viewing cinematographic film-bands, comprising in combination a casing, a film-guide mounted on said casing and formed by two branches of a plate bent at an angle and forming the rear wall of the said casing, a flap hinged to one of the side walls of the casing, the film-band being adapted to pass through the clear space between the said rear wall and flap, a film carrying and feeding means mounted in said casing within the range of one of the said branches, closing means which can be tilted laterally and is adapted to keep shut the said flap, the said means comprising a lever hinged to the flap and hook-shaped extensions, lateral slots in the flap through which the said extensions pass, and lugs in the said walls of the casing with which the said extensions are adapted to co-act.

16. An apparatus for viewing cinematographic film-bands comprising in combination a casing, film carrying and feeding means mounted in said casing, a winding-up drum and a winding-off drum arranged on the apparatus, a tensioning device coordinated to the winding-up drum and a pre-winding device coordinated to the winding-off drum, each device comprising a single-armed, spring-loaded lever and a pin secured to the free end of the corresponding lever.

17. An apparatus for viewing cinematographic film-bands comprising in combination a casing, film carrying and feeding means mounted in said casing, a winding-up drum and a winding-off drum arranged on the apparatus, a tensioning device coordinated to the winding-up drum and a prewinding device coordinated to the winding-off drum, each device comprising a single-armed, spring-loaded lever and a pin secured to the free end of the corresponding lever, and a stop on each lever adapted to cooperate with a fixed stop to limit the movement of the said lever.

18. An apparatus for viewing cinematographic film-bands comprising in combination a casing, film carrying and feeding means mounted in said casing, a winding-up drum and a winding-off drum arranged on the apparatus, a tensioning device coordinated to the winding-up drum and a prewinding device coordinated to the winding-off drum, each device comprising a single-armed, spring-loaded lever and a pin secured to the free end of the corresponding lever, and a friction coupling for the winding-up drum, the said coupling consisting of an adjustable friction member arranged in the boss of the latter and cooperating with the driven shaft of the winding-up drum.

19. An apparatus for viewing cinematographic film-bands comprising in combination a casing, film carrying and feeding means mounted in said casing, a winding-up drum and a winding-off drum arranged on the apparatus, a tensioning device coordinated to the winding-up drum and a prewinding device cordinated to the winding-off drum, each device comprising a single-armed, spring-loaded lever and a pin secured to the free end of the corresponding lever, and a friction coupling for the winding-up drum, the said coupling consisting of a plate-spring secured by means of adjustable screws in a recess of the boss of the said winding-up drum and cooperating with the driven shaft of the winding-up drum.

20. An apparatus for viewing cinematographic film-bands comprising in combination a casing, film carrying and feeding means mounted in said casing, a winding-up drum and a winding-off drum arranged on the apparatus, a tensioning device coordinated to the winding-up drum and a prewinding device coordinated to the winding-off drum, each device comprising a single-armed, spring-loaded lever and a pin secured to the free end of the corresponding lever, a tensioning pin secured to the lever of the winding-up drum, and brake-rollers carried by the said tensioning pin.

21. An apparatus for viewing cinematographic film-bands comprising in combination a casing, film carrying and feeding means mounted in said casing, a winding-up drum and a winding-off drum arranged on the apparatus, a tensioning device coordinated to the winding-up drum and a prewinding device coordinated to the winding-off drum, each device comprising a single-armed, spring-loaded lever and a pin secured to the free end of the corresponding lever, and a stop on each lever adapted to cooperate with a fixed stop to limit the movement of the said lever, a tensioning pin secured to the lever of the winding-up drum, and brake rollers carried by the said tensioning pin.

22. An apparatus for viewing cinematographic film-bands comprising in combination a casing, film carrying and feeding means mounted in said casing, a winding-up drum and a winding-off drum arranged on the apparatus, a tensioning device coordinated to the winding-up drum and a prewinding device coordinated to the winding-off drum, each device comprising a single-armed, spring-loaded lever and a pin secured to the free end of the corresponding lever, and a friction coupling for the winding-up drum, the said coupling consisting of an adjustable friction member arranged in the boss of the latter and cooperating with the driven shaft of the winding-up drum, a tensioning pin secured to the lever of the winding-up drum, and brake rollers carried by the said tensioning pin.

23. An apparatus for viewing cinematographic film-bands comprising in combination a casing, a film carrying and feeding means mounted in said casing, a winding-up drum and a winding-off drum arranged on the apparatus, a tensioning device coordinated to the winding-up drum and a prewinding device coordinated to the winding-off drum, each device comprising a single-armed, spring-loaded lever and a pin secured to the free end of the corresponding lever, and a friction coupling for the winding-up drum, the said coupling consisting of a plate-spring secured by means of adjustable screws in a recess of the boss of the said winding-up drum and cooperating with the driven shaft of the winding-up drum, a tensioning pin secured to the lever of the winding-up drum, and brake rollers carried by the said tensioning pin.

24. An apparatus for viewing cinematographic film-bands comprising in combination a casing, film carrying and feeding means mounted in said casing, a winding-up drum and a winding-off drum arranged on the apparatus, a tensioning device coordinated to the winding-up drum and a prewinding device coordinated to the winding-off drum, each device comprising a single-armed, spring-loaded lever and a pin secured to the free end of the corresponding lever, and a handle located on the winding-off drum eccentrically with respect to the drum-shaft.

25. An apparatus for viewing cinematographic film-bands, comprising in combination a casing, a film-guide mounted on said casing and formed by two branches of a plate bent at an angle and forming the rear wall of the said casing, a flap hinged to one of the side walls of the casing, the film-band being adapted to pass through between the said rear wall and flap, a film carrying and feeding means mounted in said casing mounted within the range of one of the said branches, the said film feeding means comprising a slide adapted to slide along the film-guide and yieldingly disposed grippers with teeth adapted to engage the perforations of the film-band during the feeding stroke and to yieldingly slide over these perforations during the ineffective stroke, a plate secured to the said slide and adapted to be moved into the range of the light-beams during the movement of the said slide, and an image-window and extensions for securing the correct position of the film-band located within the range of the other branch of the said plate.

26. An apparatus for viewing cinematographic film-bands, comprising in combination a casing, a film-guide mounted on said casing and formed by two branches of a plate bent at an angle and forming the rear wall of the said casing, a flap hinged to one of the side walls of the casing, the film-band being adapted to pass through the clear space between the said rear wall and flap, a film carrying and feeding means mounted in said casing within the range of one of the said branches, and an observation device mounted on the said casing, the said observation device comprising two members which are adjustable at a right angle to each other, one of these members being slidably disposed on the other member, while the latter is slidable along the lid of the said casing, and a diascopic observation glass in the member disposed slidably on the other member.

In testimony whereof I affix my signature.

ING. ALFRED GRÜNFELD.